(12) United States Patent
Kagami (10) Patent No.: US 7,692,901 B2
(45) Date of Patent: Apr. 6, 2010

(54) MAGNETORESISTIVE EFFECT THIN-FILM MAGNETIC HEAD WITH ANTI-FERROMAGNETIC LAYER FOR MAGNETIC DOMAIN CONTROL

(75) Inventor: Takeo Kagami, Tokyo (JP)

(73) Assignee: TDK Corporation, Tokyo (JP)

( * ) Notice: Subject to any disclaimer, the term of this patent is extended or adjusted under 35 U.S.C. 154(b) by 548 days.

(21) Appl. No.: 11/610,116

(22) Filed: Dec. 13, 2006

(65) Prior Publication Data

US 2008/0144226 A1 Jun. 19, 2008

(51) Int. Cl.
*G11B 5/39* (2006.01)

(52) U.S. Cl. .............................. 360/324.12; 360/324.2
(58) Field of Classification Search .................. None
See application file for complete search history.

(56) References Cited

U.S. PATENT DOCUMENTS 5,465,185 A * 11/1995 Heim et al. ............ 360/324.11
5,768,067 A    6/1998 Saito et al.
6,893,740 B2 * 5/2005 Saito .......................... 428/668
2003/0103299 A1 * 6/2003 Saito ..................... 360/324.12

FOREIGN PATENT DOCUMENTS

JP    9-198626    7/1997
JP    2006-179566    7/2006

* cited by examiner

*Primary Examiner*—Craig A Renner
*Assistant Examiner*—Tamara Ashford
(74) *Attorney, Agent, or Firm*—Oblon, Spivak, McClelland, Maier & Neustadt, L.L.P.

(57) ABSTRACT

A thin-film magnetic head includes a lower electrode layer, an MR multi-layered structure, through which a current passes in a direction perpendicular to a lamination plane, stacked on the lower electrode layer, soft magnetic layers for magnetic domain control formed on both sides in a track width direction of the MR multi-layered structure, an anti-ferromagnetic layer for magnetic domain control continuously stacked on the MR multi-layered structure and the soft magnetic layers for magnetic domain control, the anti-ferromagnetic layer mutually exchanged-coupled to the soft magnetic layers for magnetic domain control, and an upper electrode layer stacked on the anti-ferromagnetic layer for magnetic domain control.

11 Claims, 9 Drawing Sheets

MAGNETORESISTIVE EFFECT THIN-FILM MAGNETIC HEAD WITH ANTI-FERROMAGNETIC LAYER FOR MAGNETIC DOMAIN CONTROL

BACKGROUND OF THE INVENTION

1. Field of the Invention

The present invention relates to a thin-film magnetic head with a magnetoresistive effect (MR) read head element for reading out a magnetic intensity in a magnetic recording medium or the like and outputting it as a signal, to a magnetic disk drive apparatus provided with the thin-film magnetic head, and to a manufacturing method of the thin-film magnetic head.

2. Description of the Related Art

In order to satisfy the demand for higher recording density and downsizing in a hard disk drive (HDD) apparatus, higher sensitivity and larger output of a thin-film magnetic head are required. In accordance with the requirement, the performance improvement on a giant magnetoresistive effect (GMR) head with a GMR read head element has progressed. At the same time, a practical application of a tunnel magnetoresistive effect (TMR) head with a TMR read head element, in which the resistance change ratio is expected to more than double that of the GMR head, has also begun.

There exist two types of head structures in the GMR head depending on a difference in flowing direction of sense currents. One GMR head is referred to as a CIP (Current In Plane)-GMR head in which the sense current flows in parallel to a lamination plane (film surface). The other GMR head is referred to as a CPP (Current Perpendicular to Plane)-GMR head in which the sense current flows in a direction perpendicular to the film surface as well as in the TMR head.

In such CPP-GMR or TMR head, because magnetic shield layers themselves can be used as electrode layers, short-circuit or insufficient insulation between the magnetic shield layers and an MR multi-layered structure, which has been a serious problem in narrowing read gaps in the CIP-GMR head, does not inherently occur. Therefore, the CPP-GMR head and the TMR head have been very advantageous to a high recording density.

On both sides of a TMR multi-layered structure or a GMR multi-layered structure in the track width direction in such TMR or CPP-GMR head, magnetic domain control bias layers for performing magnetic domain control of a magnetization-free layer are generally formed.

U.S. Pat. No. 5,768,067 discloses a magnetic head with an abutted junction structure in which magnetic domain control bias layers each including an anti-ferromagnetic film and a soft magnetic film directly contacting the anti-ferromagnetic film to generate an exchange-coupling magnetic field are formed outside a read track region on both end sections of an MR film.

The use of the soft magnetic film and the anti-ferromagnetic film as the magnetic domain control bias layer permits narrowing of an effective track width as much as possible even when the width of the free layer of the MR multi-layered structure is the same. Further, because a magnetization-fixed layer in the MR multi-layered structure can be configured by a hard magnetic layer, a read gap can be made as narrow as possible.

The level of the exchange coupling between the soft magnetic film and the anti-ferromagnetic film tends to rapidly decrease when the thickness of the anti-ferromagnetic layer reduces. Thus, in the magnetic head with the conventional abutted junction structure, the thickness of the anti-ferromagnetic layers becomes very small in the vicinity of the junction, which is important in applying to the magnetic free layer a bias magnetic field for magnetic domain control resulting the exchange coupling in that area to become very weak. This makes it impossible to apply to the free layer of the MR multi-layered structure a sufficient bias magnetic field for magnetic domain control.

SUMMARY OF THE INVENTION

It is therefore an object of the present invention to provide a thin-film magnetic head with an MR element capable of supplying to a magnetization-free layer of an MR multi-layered structure a sufficient bias magnetic field for magnetic domain control, resulting in a good linear response with no noise, to provide a magnetic disk drive apparatus provided with the thin-film magnetic head, and to provide a manufacturing method of the thin-film magnetic head.

According to the present invention, a thin-film magnetic head includes a lower electrode layer, an MR multi-layered structure, through which a current passes in a direction perpendicular to a lamination plane, stacked on the lower electrode layer, soft magnetic layers for magnetic domain control formed on both sides in a track width direction of the MR multi-layered structure, an anti-ferromagnetic layer for magnetic domain control continuously stacked on the MR multi-layered structure and the soft magnetic layers for magnetic domain control, the anti-ferromagnetic layer mutually exchanged-coupled to the soft magnetic layers for magnetic domain control, and an upper electrode layer stacked on the anti-ferromagnetic layer for magnetic domain control.

The anti-ferromagnetic layer for magnetic domain control mutually exchange-coupled to the soft magnetic layers for magnetic domain control continuously covers over the MR multi-layered structure and the soft magnetic layers for magnetic domain control. Thus, it is possible to make the thickness of the anti-ferromagnetic layer for magnetic domain control sufficiently large in the vicinity of a junction of the MR multi-layered structure. Thereby, the exchange-coupling between the anti-ferromagnetic layer for magnetic domain control and the soft magnetic layers for magnetic domain control is made sufficiently so strong that in this portion, it becomes possible to supply to the magnetization-free layer of the MR multi-layered structure sufficient bias magnetic fields for magnetic domain control. As a result, the magnetization-free layer can be controlled to have a single magnetic domain with reliability, and as a result, noise such as Barkhausen noise can be suppressed to achieve better linear response characteristics of the MR read head element.

It is preferred that the MR multi-layered structure includes a magnetization-fixed layer, a magnetization-free layer, and a nonmagnetic conductive layer or a tunnel barrier layer stacked between the magnetization-fixed layer and the magnetization-free layer. In this case, preferably, the magnetization-fixed layer has a soft magnetic layer for magnetization fixing and an anti-ferromagnetic layer for magnetization fixing, which is exchange-coupled to the soft magnetic layer for magnetization fixing, or the magnetization-fixed layer has a hard magnetic layer for magnetization fixing.

It is also preferred that a thickness of the anti-ferromagnetic layer for magnetic domain control is 5 nm or more.

It is further preferred that an inductive write head element is formed on the upper electrode layer of an MR read head element.

According to the present invention, a magnetic disk drive apparatus includes a magnetic disk, at least one of the aforementioned thin-film magnetic head and a support mechanism for supporting the at least one thin-film magnetic head so that the at least one thin-film magnetic head faces a surface of the magnetic disk.

According to the present invention, further, a manufacturing method of a thin-film magnetic head includes a step of depositing an MR multi-layered film on a lower electrode layer, a patterning step of patterning the deposited MR multi-layered film to define a track width so as to form a MR multi-layered structure, a lift-off step of depositing at least an insulation film and a soft magnetic film for magnetic domain control without removing a mask used in the patterning step and removing the mask to perform lift-off operation so as to form an insulation layer and a soft magnetic layer for magnetic control, a step of stacking an anti-ferromagnetic layer for magnetic domain control on the MR multi-layered structure and the soft magnetic layers for magnetic domain control, and a step of stacking an upper electrode layer on the anti-ferromagnetic layer for magnetic domain control.

After the lift-off for forming the insulation layer and the soft magnetic layers for magnetic domain control, the anti-ferromagnetic layer for magnetic domain control is stacked on the MR multi-layered structure and the soft magnetic layers for magnetic domain control. Therefore, the anti-ferromagnetic layer for magnetic domain control continuously covers over the MR multi-layered structure and the soft magnetic layers for magnetic domain control. Thus, it is possible to make the thickness of the anti-ferromagnetic layer for magnetic domain control sufficiently large in the vicinity of a junction of the MR multi-layered structure. Thereby, the exchange-coupling between the anti-ferromagnetic layer for magnetic domain control and the soft magnetic layers for magnetic domain control is made sufficiently so strong that in this portion, it becomes possible to supply to the magnetization-free layer of the MR multi-layered structure sufficient bias magnetic fields for magnetic domain control. As a result, the magnetization-free layer can be controlled to have a single magnetic domain with reliability, and as a result, noise such as Barkhausen noise can be suppressed to achieve better linear response characteristics of the MR read head element.

It is preferred that the lift-off step includes sequentially depositing an insulation film, a soft magnetic film for magnetic domain control and a protection film for magnetic domain control without removing the mask used in the patterning step, and then removing the mask to perform lift-off operation so as to form an insulation layer, a soft magnetic layer for magnetic domain control and a protection layer for magnetic domain control.

It is also preferred that the lift-off step includes sequentially depositing only an insulation film and a soft magnetic film for magnetic domain control without removing the mask used in the patterning step, and then removing the mask to perform lift-off operation so as to form an insulation layer and a soft magnetic layer for magnetic domain control.

It is further preferred that the depositing step of the MR multi-layered film includes sequentially depositing at least a magnetization-fixed film, a nonmagnetic conductive film or a tunnel barrier film and a magnetization-free film.

It is preferred that the step of depositing the magnetization-fixed film includes depositing a soft magnetic film for magnetization fixing and an anti-ferromagnetic film for magnetization fixing, which is mutually exchange-coupled to the soft magnetic layer for magnetization fixing, or depositing a hard magnetic film for magnetization fixing.

It is also preferred that the step of stacking the anti-ferromagnetic layer for magnetic domain control includes stacking an anti-ferromagnetic layer for magnetic domain control with a thickness of 5 nm or more.

It is further preferred that the manufacturing method further includes a step of forming an inductive write head element on the upper electrode layer of an MR read head element.

It is still further preferred that the manufacturing method further includes a step of separating a wafer on which a number of the thin-film magnetic heads are formed into a plurality of bars on which a plurality of the thin-film magnetic heads are aligned in a row, and a step of separating each of the bars into a plurality of individual thin-film magnetic heads after polishing each bar.

Other objectives and advantages of the present invention will become more apparent from the following description of preferred embodiments of the present invention with reference to accompanying drawings.

DESCRIPTION OF THE PREFERRED EMBODIMENTS

Figure 1:
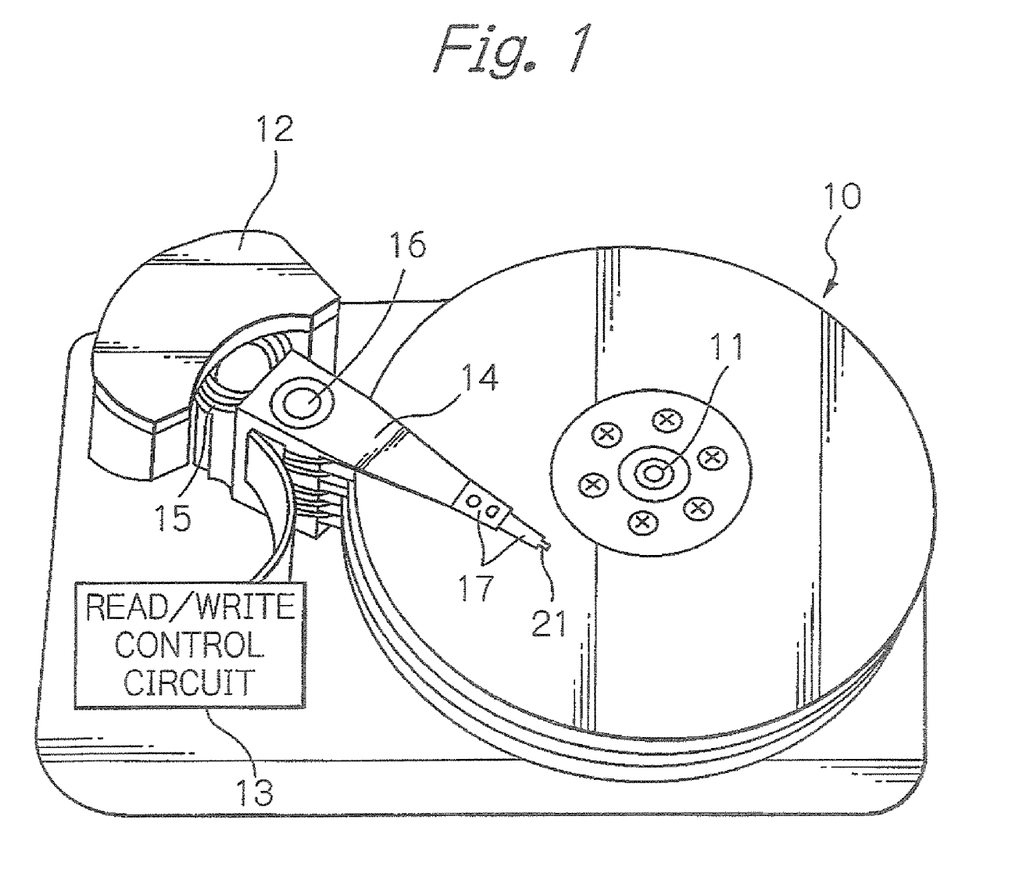
FIG. 1 is a perspective view schematically illustrating a configuration of main parts of a magnetic disk drive apparatus, as a preferred embodiment of the present invention.
Figure 2:
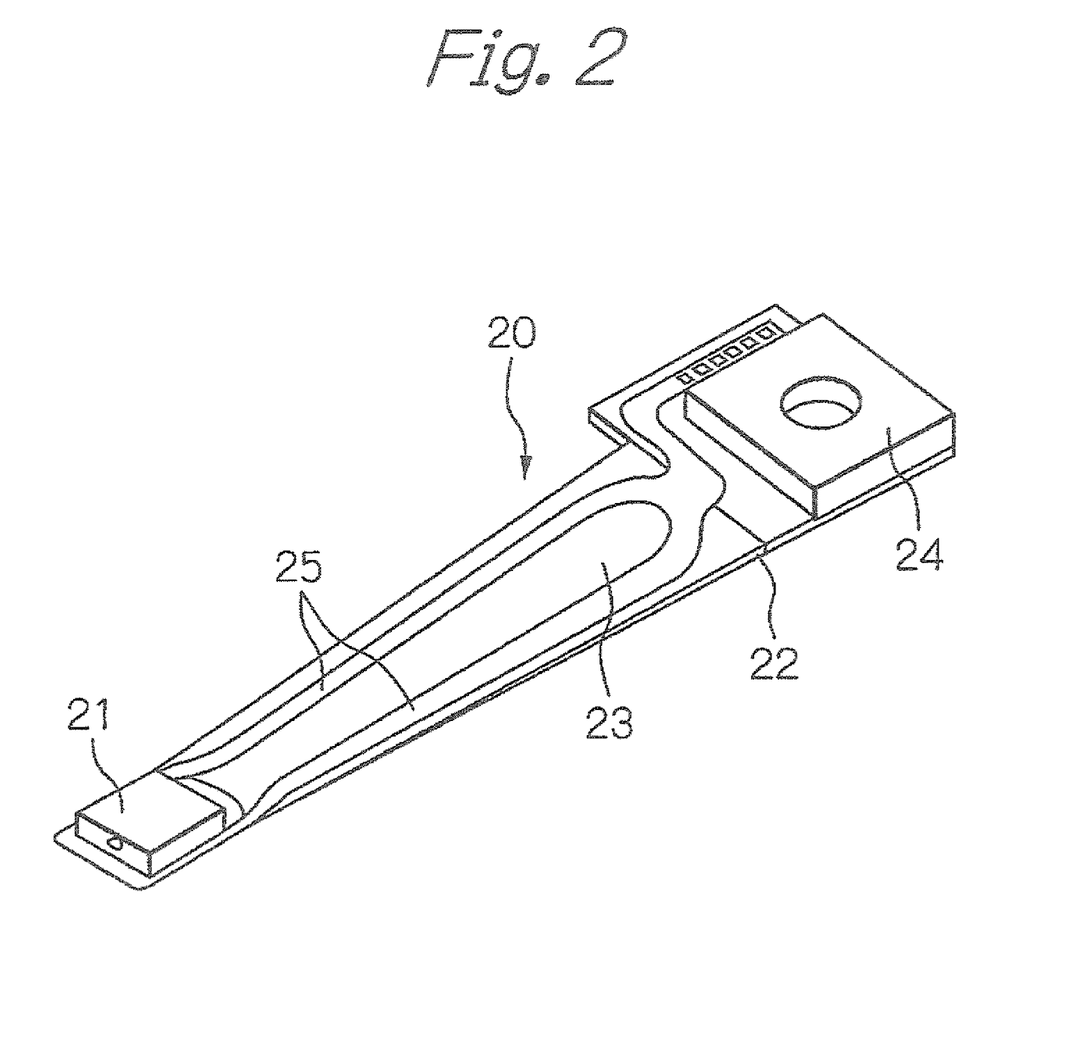
FIG. 2 is a perspective view illustrating one configuration example of an HGA shown in FIG. 1.
Figure 3:
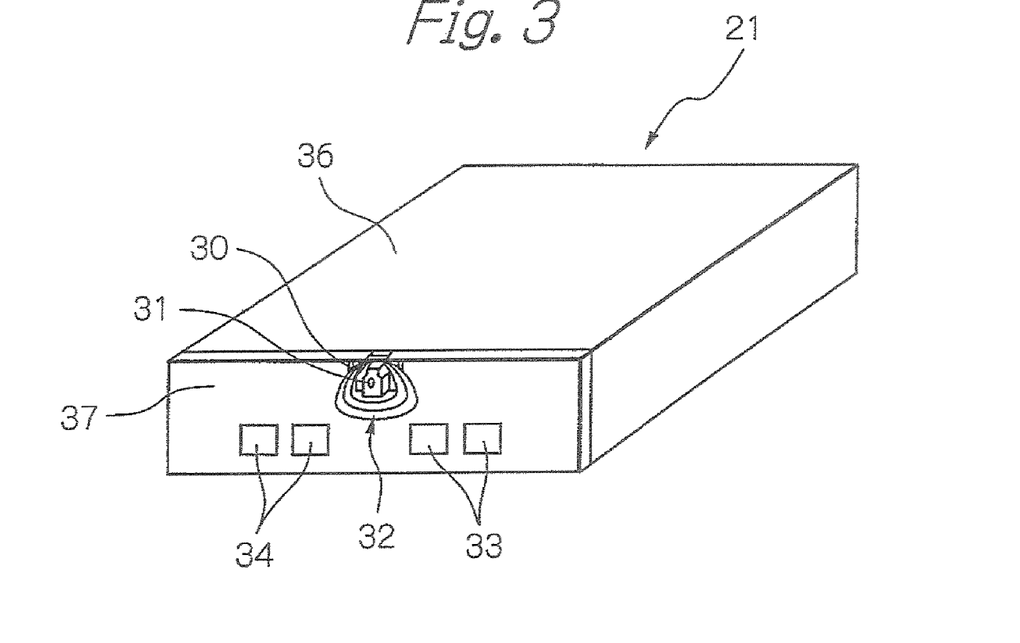
FIG. 3 is a perspective view illustrating a composite thin-film magnetic head attached to the distal end section of the HGA shown in FIG. 2.
Figure 4:
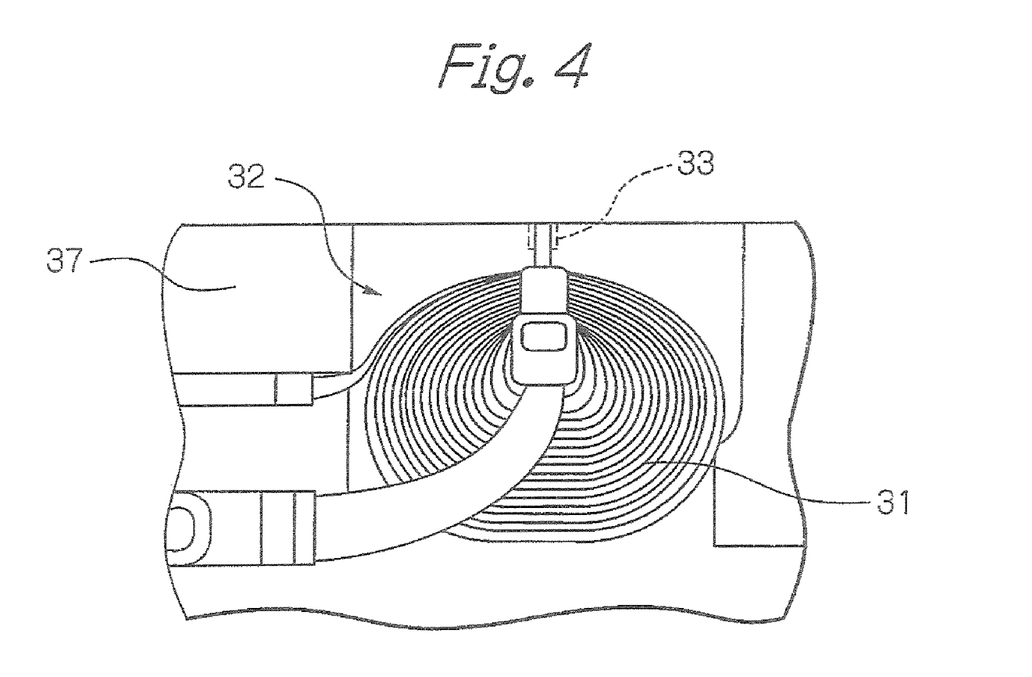
FIG. 4 is a plan view illustrating a magnetic head element portion of the composite thin-film magnetic head shown in FIG. 3, seen from an element formation surface side of a slider substrate.

FIG. 1 schematically illustrates a configuration of main parts of a magnetic disk drive apparatus, as a preferred embodiment of the present invention, FIG. 2 illustrates one configuration example of an HGA shown in FIG. 1, FIG. 3 illustrates a composite thin-film magnetic head attached to the distal end section of the HGA shown in FIG. 2, and FIG. 4 illustrates a magnetic head element portion of the composite thin-film magnetic head shown in FIG. 3, seen from an element formation surface side of a slider substrate.

In FIG. 1, reference numeral 10 denotes a plurality of magnetic hard disks rotating in operation around the rotation shaft of a spindle motor 11, 12 denotes an assembly carriage device for positioning each composite thin-film magnetic head or magnetic head slider on a track of each disk, and 13 denotes a read/write control circuit for controlling read and write operations of the thin-film magnetic head, respectively.

The assembly carriage device 12 has a plurality of drive arms 14 stacked along a pivot-bearing axis 16. These drive arms 14 are capable of rotating around the axis 16 and driven by a voice coil motor (VCM) 15. An HGA 17 is mounted on a top section of each arm 14. Each HGA 17 has the composite thin-film magnetic head or the magnetic head slider 21 mounted at its top end section so that the slider opposes to a surface of each magnetic disk 10. In modifications, a single magnetic disk 10, a single drive arm 14 and a single HGA 17 may be provided.

As shown in FIG. 2, the HGA is assembled by fixing the magnetic head slider 21 having a TMR read head element and an inductive write head element to a top end section of a suspension 20, and by electrically connecting one ends of trace conductors to terminal electrodes of the magnetic head slider 21.

The suspension 20 is substantially constituted by a load beam 22 for producing a load to be applied to the magnetic head slider 21, a resilient flexure 23 fixed on and supported by the load beam 22, a base plate 24 attached or formed at a base end section of the load beam 22, and a lead conductor member 25 fixed on the flexure 23 and the load beam 22 and provided with the trace conductors and connection pads electrically connected both ends of the trace conductors.

A structure of the suspension of the HGA that is the magnetic head assembly according to the present invention is not limited to the aforementioned structure. Furthermore, although it is not shown, a head drive IC chip may be mounted on a middle of the suspension 20.

As shown in FIGS. 3 and 4, the magnetic head slider 21 in this embodiment has, on its element-forming surface 37 that is one side surface of the head with respect to its bottom surface consisting of an air bearing surface (ABS) 36, a composite magnetic head element 32 consisting of an MR read head element 30 and an inductive write head element 31 laminated each other, and four signal electrode terminals 33 and 34 electrically connected to these elements 30 and 31. The positions of these electrode terminals are not limited to these shown in FIG. 3.

Figure 5:
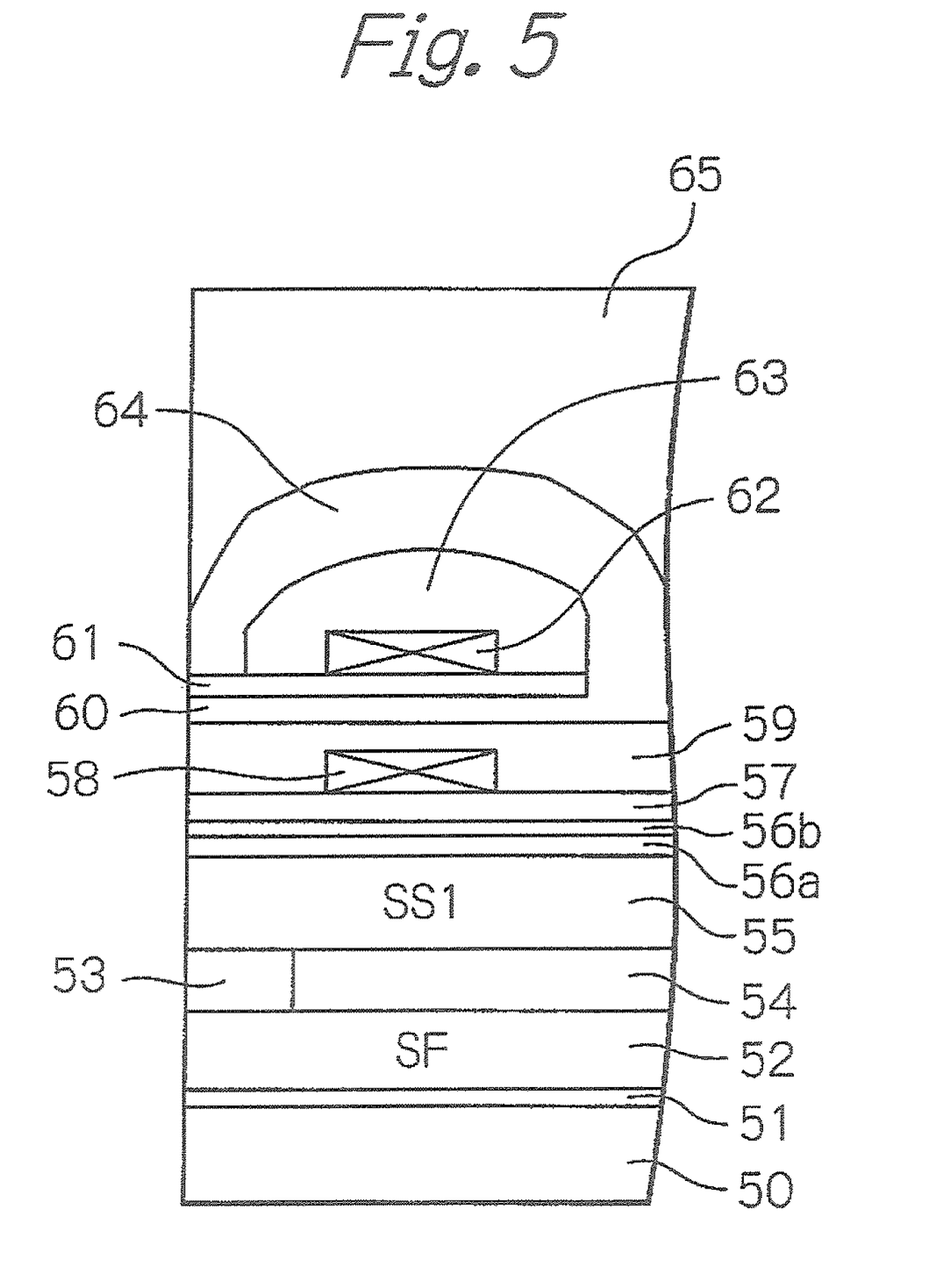
FIG. 5 is a central cross-sectional view schematically illustrating the configuration of the composite thin-film magnetic head shown in FIG. 3.
Figure 6:
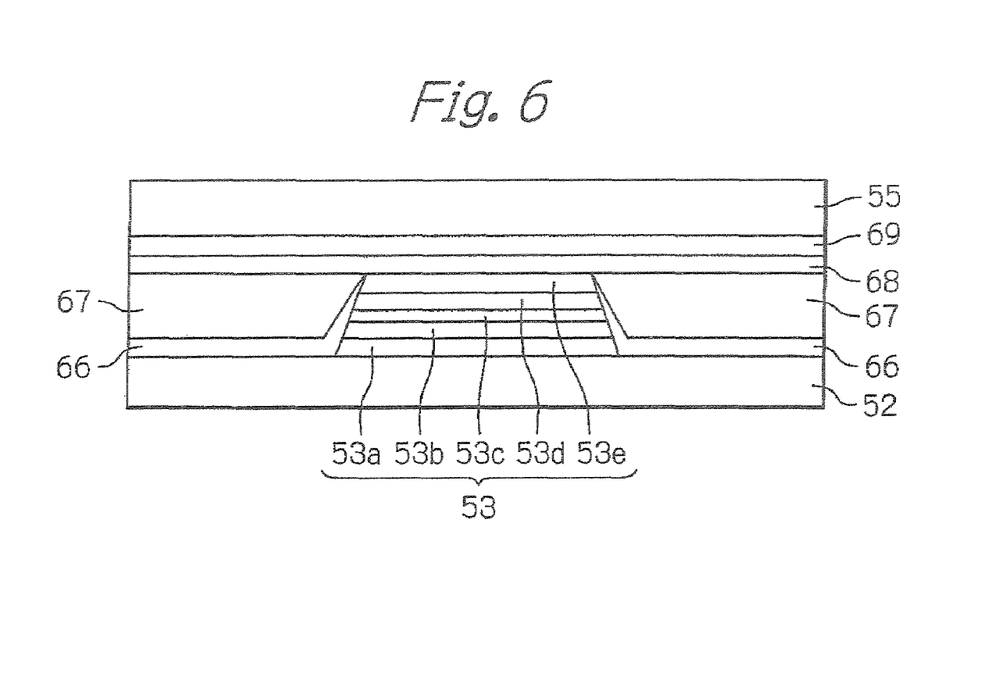
FIG. 6 is a cross-sectional view schematically illustrating the structure of a TMR read head element portion of the composite thin-film magnetic head shown in FIG. 3.

FIG. 5 schematically illustrates the structure of the composite thin-film magnetic head according to this embodiment, and FIG. 6 schematically illustrates the structure of the TMR read head element portion of the composite thin-film magnetic head. It should be noted that FIG. 5 shows a cross section formed by a plane perpendicular to the ABS of the composite thin-film magnetic head and to the track width direction thereof, whereas FIG. 6 shows a cross section formed by a plane parallel to the ABS. In this embodiment, the MR read head element is a TMR read head element and the inductive write head element is a write head element with a perpendicular magnetic recording structure. However, in modifications, the MR read head element may be a CPP-GMR read head element and the inductive write head element may be a write head element with an in-plane or horizontal magnetic recording structure.

In FIG. 5, reference numeral 50 denotes a substrate or wafer, 51 denotes an under insulation layer stacked on the substrate 50, 52 denotes a lower electrode layer that serves also as a lower shield layer (SF), 53 denotes a TMR multi-layered structure stacked on the lower electrode layer 52, 54 denotes an insulation layer stacked on the lower electrode layer 52, and 55 denotes an upper electrode layer that serves also as an upper shield layer (SS1) stacked on the TMR multi-layered structure and the insulation layer 54, respectively. The under insulation layer 51, the lower electrode layer 52, the TMR multi-layered structure 53, the insulation layer 54 and the upper electrode layer 55 configure the TMR read head element.

On the TMR read head element, an inductive write head element is formed via an insulation layer 56a and a soft magnetic layer 56b. The inductive write head element essentially consists of an insulation layer 57, a backing coil layer 58, a backing coil insulation layer 59, a main magnetic pole layer 60, an insulation gap layer 61, a write coil layer 62, a write coil insulation layer 63 and an auxiliary magnetic pole layer 64. A protection layer 65 is formed on the inductive write head element.

As shown in FIG. 6, the TMR read head element of this embodiment essentially consists of the lower electrode layer 52, the TMR multi-layered structure 53 stacked on the lower electrode layer 52, insulation layers 66 formed on the both sides of the TMR multi-layered structure 53 in the track width direction, soft magnetic layers for magnetic domain control 67 stacked on the insulation layers 66, an anti-ferromagnetic layer for magnetic domain control 68 continuously stacked on the MR multi-layered structure 53 and the soft magnetic layers for magnetic domain control 67, a second upper metallic layer 69 stacked on the anti-ferromagnetic layer for magnetic domain control 68, and the upper electrode layer 55 stacked on the second upper metallic layer 69. The soft magnetic layers for magnetic domain control 67 and the anti-ferromagnetic layer for magnetic domain control 68 are mutually exchange-coupled.

The MR multi-layered structure 53 itself consists of a lower metallic layer 53a, a magnetization-fixed layer 53b, a tunnel barrier layer 53c, a magnetization-free layer (free layer) 53d and a first upper metallic layer 53e stacked each other in this order.

According to this embodiment, as aforementioned, the anti-ferromagnetic layer for magnetic domain control 68 that is mutually exchange-coupled to the soft magnetic layers for magnetic domain control 67 is continuously stacked on the TMR multi-layered structure 53 and the soft magnetic layers for magnetic domain control 67 to cover these components 53 and 67. Thus, it is possible to make the thickness of the anti-ferromagnetic layer for magnetic domain control 68 sufficiently large in the vicinity of a junction of the TMR multi-layered structure 53.

Figure 7:
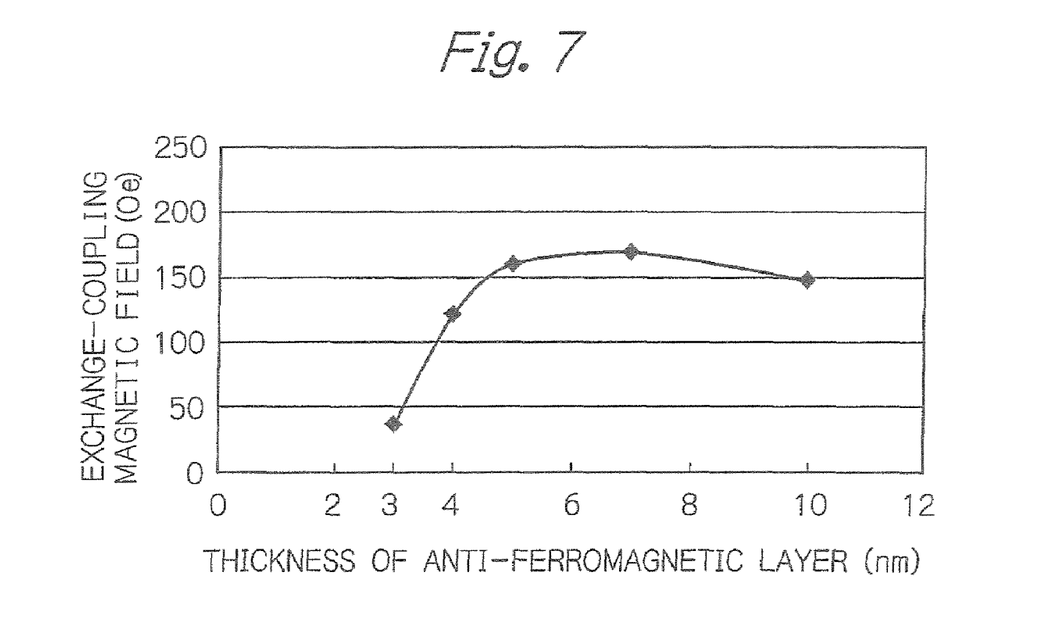
FIG. 7 is a graph illustrating characteristics of magnitude of an exchange-coupling magnetic field of an anti-ferromagnetic layer and a soft magnetic layer with respect to the thickness of the anti-ferromagnetic layer.

FIG. 7 illustrates characteristics of exchange-coupling magnetic field between the anti-ferromagnetic layer and the soft magnetic layer with respect to the thickness of the anti-ferromagnetic layer. In this example, the anti-ferromagnetic layer is made of iridium manganese (IrMn), and the characteristics show the exchange-coupling magnetic field (Oe) when the thickness (nm) of the anti-ferromagnetic layer changes.

As will be apparent from the figure, in a range of the thickness of the anti-ferromagnetic layer equal to or thicker than 5 nm (but equal to or thinner than 10 nm), stable and sufficient exchange-coupling magnetic field can be obtained. Then, according to this embodiment, it is possible to make the thickness of the anti-ferromagnetic layer for magnetic domain control 68 sufficiently large in the vicinity of the junction of the TMR multi-layered structure. Therefore, the exchange-coupling between the anti-ferromagnetic layer for magnetic domain control 68 and the soft magnetic layers for magnetic domain control 67 in that portion is made sufficiently so strong that it becomes possible to supply to the free layer 53d of the TMR multi-layered structure 53 sufficient bias magnetic fields for magnetic domain control. Thus, the free layer will be controlled to have a single magnetic domain with reliability, and as a result, noise such as Barkhausen noise can be suppressed to achieve better linear response characteristics of the TMR read head element.

Hereinafter, a manufacturing process for the composite thin-film magnetic head according to this embodiment will be described.

Figure 8:
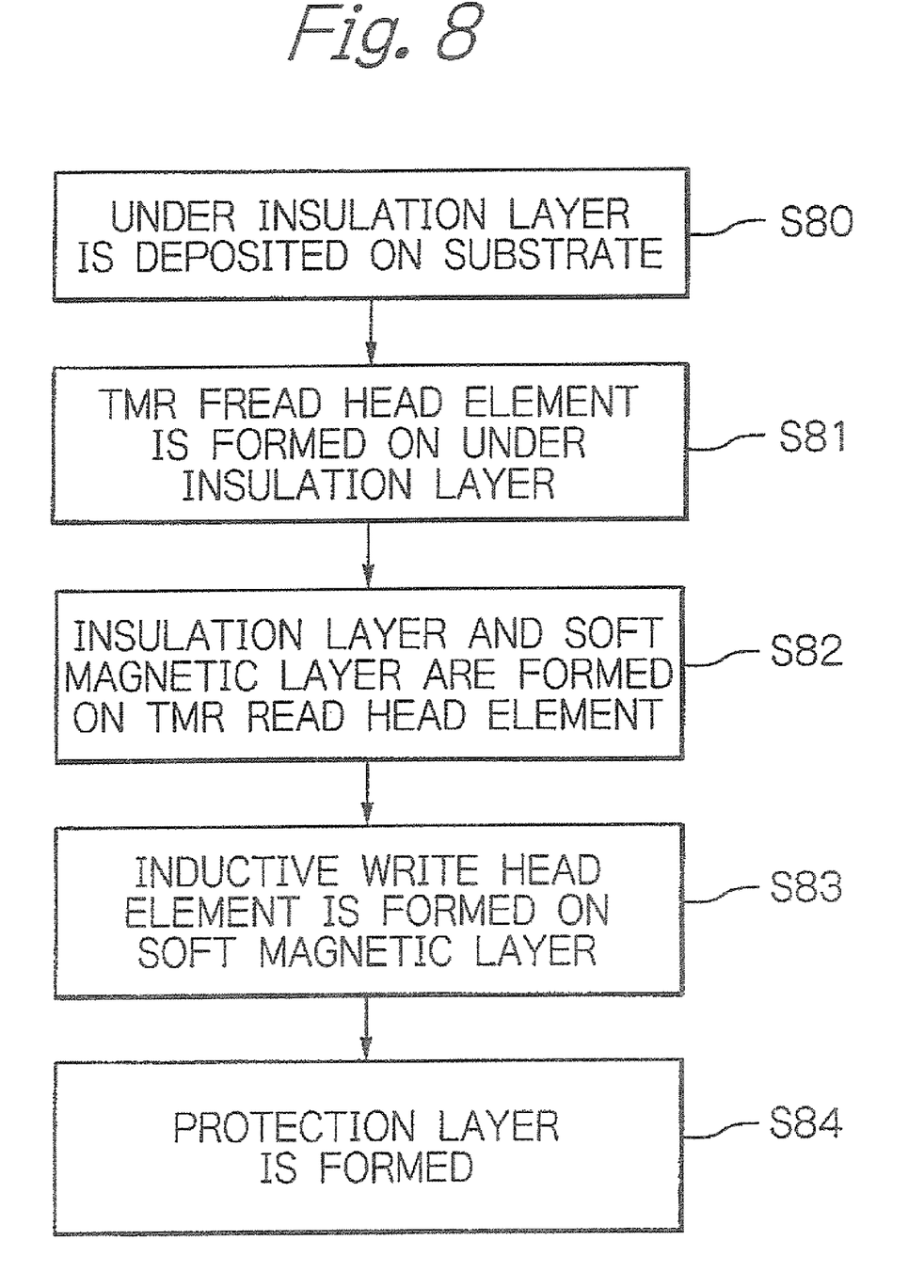
FIG. 8 is a flowchart illustrating a manufacturing process of the composite thin-film magnetic head.
Figure 9:
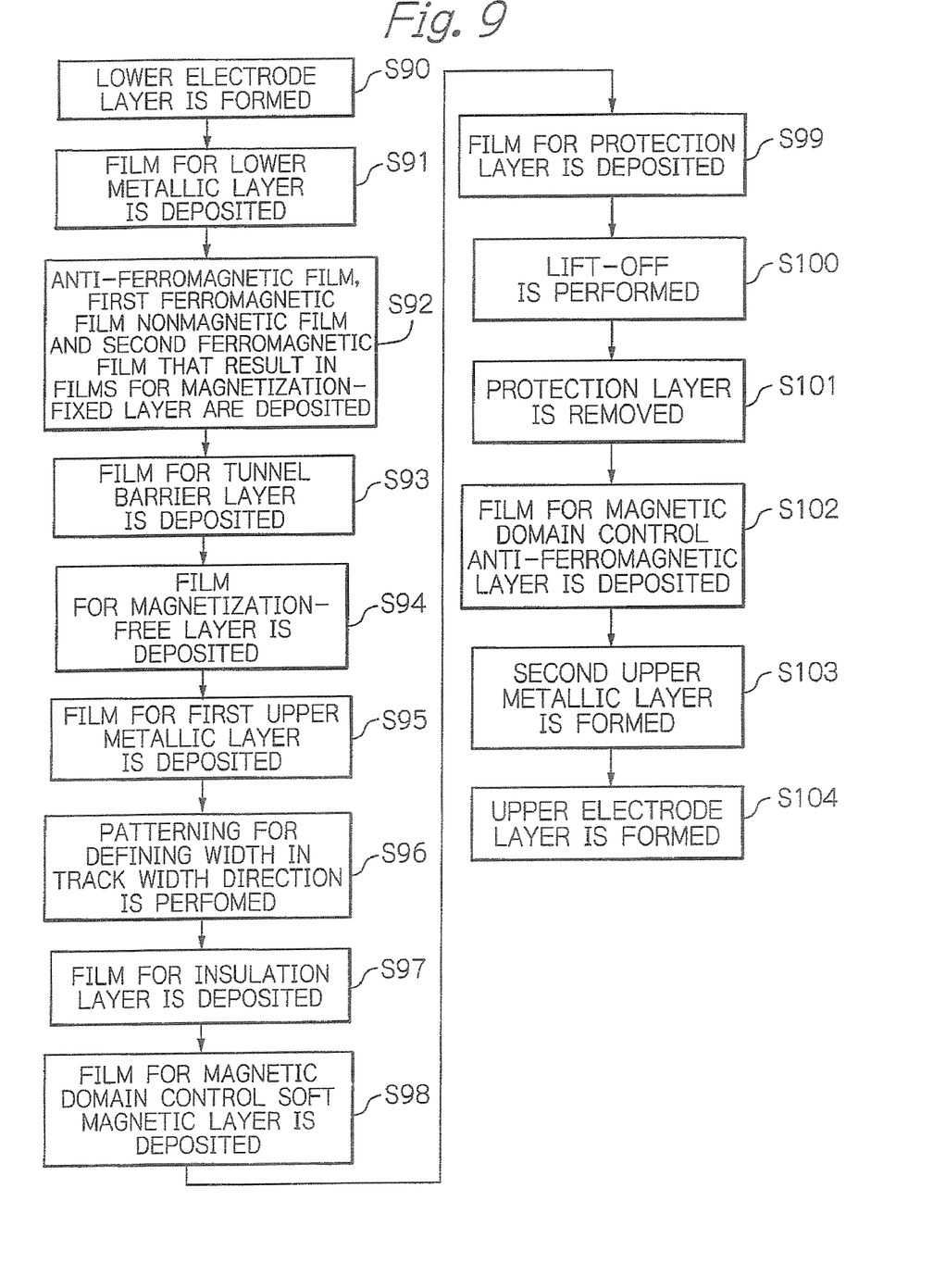
FIG. 9 is a flowchart illustrating in detail a manufacturing process of a read head element in the manufacturing process shown in FIG. 8.

FIG. 8 illustrates a flow of the manufacturing process of the thin-film magnetic head according to this embodiment, FIG. 9 illustrates in detail a manufacturing process of the TMR read head element in the manufacturing process shown in FIG. 8, and FIGS. 10a-10d illustrate layer structures in the manufacturing process shown in FIG. 9.

According to this manufacturing process, a composite thin-film magnetic head with a TMR read head element is fabricated. However, a manufacturing process of a composite thin-film magnetic head with a CPP-GMR read head element will be fundamentally the same as this process except that a non-magnetic conductive layer is fabricated instead of a tunnel barrier layer.

As shown in FIGS. 8 and 5, first, the substrate 50 made of a conductive material such as AlTiC ($Al_2O_3$—TiC) is prepared. Then, on this substrate 50, the under insulation layer 51 made of an insulation material such as $Al_2O_3$ or silicon oxide ($SiO_2$), with a thickness of about 0.05 to 10 μm, is formed by using a sputtering method for example (Step S80).

Then, on the under insulation layer 51, the TMR read head element including the lower electrode layer 52 that also serves as lower shield layer (SF), the TMR multi-layered structure 53, the insulation layer 54, the insulation layers 66 (FIG. 6), the soft magnetic layers for magnetic domain control 67 (FIG. 6), the anti-ferromagnetic layer for magnetic domain control 68 (FIG. 6), and the upper electrode layer 55 that also serves as the upper shield layer (SS1) is formed (Step S81). The manufacturing process of the TMR read head element will be described in detail later.

The insulation layer 56a and the soft magnetic layer 56b are formed on the TMR read head element (Step S82). The insulation layer 56a is made of an insulation material such as $Al_2O_3$, $SiO_2$, aluminum nitride (AlN) or diamond-like carbon (DLC), and formed by a sputtering method or a chemical vapor deposition (CVD) method for example to have a thickness of about 0.3 μm. The soft magnetic layer 56b is made of a magnetic metal material such as nickel iron (NiFe), cobalt iron (CoFe), nickel iron cobalt (NiFeCo), iron aluminum silicide (FeAlSi), iron nitride (FeN), iron zirconium nitride (FeZrN), iron tantalum nitride (FeTaN), cobalt zirconium niobium (CoZrNb) or cobalt zirconium tantalum (CoZrTa), and is formed by a frame plating method for example to have a thickness of about 1.0 μm. The function of the insulation layer 56a and the soft magnetic layer 56b is to separate the TMR read head element and the inductive write head element formed thereon.

Then, on the soft magnetic layer 56b, the inductive write head element including the insulation layer 57, the backing coil layer 58, the backing coil insulation layer 59, the main magnetic pole layer 60, the insulation gap layer 61, the write coil layer 62, the write coil insulation layer 63 and the auxiliary magnetic pole layer 64 is formed (Step S83).

In this embodiment, the inductive write head element with a perpendicular magnetic recording structure is used. However, in modifications, an inductive write head element of with a horizontal magnetic recording structure may be used. Also, as the inductive write head element with a perpendicular magnetic recording structure, various structures other than that shown in FIG. 5 can be applicable.

The insulation layer 57 is formed by depositing an insulation material such as $Al_2O_3$ or $SiO_2$ on the soft magnetic layer 56b by for example a sputtering method. If necessary, the top surface of the insulation layer 57 may be planarized by CMP, for example. On the insulation layer 57, the backing coil layer 58 made of a conductive material such as copper (Cu) is formed by a frame plating method for example to have a thickness of about 1 to 5 μm. The function of the backing coil layer 58 is to lead a write magnetic flux to prevent an adjacent track erase (ATE). The backing coil insulation layer 59 is formed of a hot-cured novolak resist for example by a photolithography method or the like to have a thickness of about 0.5 to 7 μm so as to cover the backing coil layer 58.

On the backing coil insulation layer 59, the main magnetic pole layer 60 is formed. This main magnetic pole layer 60 functions as a flux path for converging and leading the magnetic flux derived at the write coil layer 62 to the perpendicular magnetic recording layer of the magnetic disk to be written. The main magnetic pole layer 60 is made of a metallic magnetic material such as NiFe, CoFe, NiFeCo, FeAlSi, FeN, FeZrN, FeTaN, CoZrNb or CoZrTa, or a multilayered-film including these materials, and formed by a frame plating method for example to have a thickness of about 0.5 to 3 μm.

On the main magnetic pole layer 60, formed is the insulation gap layer 61 by depositing an insulation film such as $Al_2O_3$ or $SiO_2$ using a sputtering method for example. On the insulation gap layer 61, the write coil insulation layer 63 made of a heat-cured novolak resist for example is formed to have a thickness of about 0.5 to 7 μm. Inside the write coil insulation layer 63, the write coil layer 62 made of a conductive material such as Cu for example is formed by a frame plating method or the like to have a thickness of about 1 to 5 μm.

The auxiliary magnetic pole layer 64 made of a metallic magnetic material such as NiFe, CoFe, NiFeCo, FeAlSi, FeN, FeZrN, FeTaN, CoZrNb or CoZrTa, or a multi-layered film including these materials is formed by a frame plating method for example to have a thickness of about 0.5 to 3 μm so as to cover the write coil insulation layer 63. The auxiliary magnetic pole layer 64 configures a return yoke.

Then, the protective layer 65 is formed on the inductive write head element by depositing $Al_2O_3$, $SiO_2$ or the like using a sputtering method for example (Step S84).

Thereby, a wafer process of the thin-film magnetic head is completed. The function of a manufacturing process for the thin-film magnetic head after the wafer process, for example a machine process, is to separate the wafer with a number of thin-film magnetic heads into a plurality of bars each having a predetermined number of thin-film magnetic heads aligned in a row, and to separate each resultant bar into a plurality of individual thin-film magnetic heads after each bar is polished. Such machine process is well known, and thus the details are not described.

Hereinafter, the manufacturing process of the TMR read head element in this embodiment will be described in detail with reference to FIGS. 9 and 10. It is noted that in this embodiment the magnetization-fixed layer has a structure utilizing exchange coupling between an anti-ferromagnetic film and a soft magnetic film.

First, on the under insulation layer 51 (FIG. 5), the lower electrode layer 52 that serves also as the lower shield layer is formed (Step S90). The lower electrode layer 52 is formed by stacking a metallic magnetic material such as NiFe, CoFe, FeNiCo, FeAlSi, FeN, FeZrN, FeTaN, CoZrNb or CoZrTa by a frame plating method for example to have a thickness of about 0.1 to 3 μm. In a desired embodiment, as for the lower electrode layer 52, NiFe with a thickness of about 2 μm is formed.

On the lower electrode layer 52, deposited is a two-layered structure film for a lower metallic layer 53a', consisting of a first film and a second film laminated on the first film, by a sputtering method for example (Step S91). The first film is made of Ta, chrome (Cr), hafnium (Hf), niobium (Nb), zirconium (Zr), Ti, molybdenum (Mo), tungsten (W) or the like, having a thickness of about 0.5 to 5 nm. The second film is made of chromium titanium (CrTi), ruthenium (Ru), NiCr, NiFe, NiFeCr, cobalt (Co), CoFe or the like, having a thickness of about 1 to 6 nm. In a desired embodiment, as the film for the lower metallic layer 53a', a Ta film with a thickness of about 1 µm is deposited and an Ru film with a thickness of about 3 nm is deposited on the Ta film.

Films for the magnetization-fixed layer 53b' are deposited thereon (Step S92). In this embodiment, the films for the magnetization-fixed layer 53b' are formed by sequentially depositing an anti-ferromagnetic film (film for a pinning layer) made of IrMn, PtMN, NiN, RuRhMn or the like to have a thickness of about 5 to 30 nm, a ferromagnetic film (film for an outer pinned layer) made of CoFe, CoFeSi, CoMnGe, CoMnSi, CoMnAl or the like to have a thickness of about 1 to 3 nm, a film for a nonmagnetic layer made of an alloy including one or at least two of Ru, rhodium (Rh), iridium (Ir), Cr, rhenium (Re), Cu or the like to have a thickness of about 0.8 nm, and a ferromagnetic film (film for an inner pinned layer) made of CoFe, CoFeSi, CoMnGe, CoMnSi, CoMnAl or the like to have a thickness of about 1 to 3 nm, by a sputtering method for example. In a desired embodiment, as the film for the magnetization-fixed layer 53b', an IrMn film with a thickness of about 5 nm, a CoFe film with a thickness of about 3 nm, an Ru film with a thickness of about 0.8 nm and a CoFe film with a thickness of about 3 nm are stacked in this order from the bottom.

On the film for the magnetization-fixed layer 53b', a film for the tunnel barrier layer 53c' made of an oxide including aluminum (Al), Ti, Ta, Zr, Hf, magnesium (Mg), silicon (Si) or zinc (Zn) is deposited to have a thickness of about 0.5 to 1 nm (Step S93). In a desired embodiment, as the film for the tunnel barrier layer 53c', an $Al_2O_3$ film with a thickness of about 0.6 nm is deposited.

On the film for the tunnel barrier layer 53c', a high polarization film made of CoFe, CoFeSi, CoMnGe, CoMnSi, CoMnAl or the like, with a thickness of about 1 nm, and a soft magnetic film made of NiFe or the like, with a thickness of about 1 to 9 nm are sequentially deposited by a sputtering method, for example, to form a film for the magnetization-free layer (free layer) 53d' (Step S94). In a desired embodiment, as the film for the free layer 53d', a CoFe film with a thickness of about 1 nm is deposited and a NiFe film with a thickness of about 3 nm is deposited on the CoFe film.

Figure 10A:
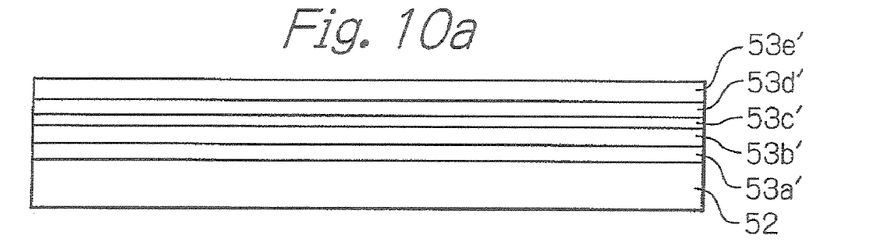
FIGS. 10a to 10d are process cross-sectional views illustrating the manufacturing process shown in FIG. 9.

A film for the first upper metallic layer 53e' made of a nonmagnetic conductive material such as Ta, Ru, Hf, Nb, Zr, Ti, Cr, W or the like with a thickness of about 1 to 10 nm is deposited to have a single layer structure or a two or more layers structure by a sputtering method for example (Step S95). In a desired embodiment, as the film for the first upper metallic layer 53e', a Ta film with a thickness of about 6 nm is deposited. FIG. 10a shows this state.

Then, the TMR multi-layered film thus formed is patterned to define a width TW in the track width direction (Step S96). First, a mask (not shown) that serves as a resist pattern for lift-off is formed on the TMR multi-layered film, and then an ion milling, for example an ion beam etching by Ar ions, is performed by using the mask. The ion-milling provides the TMR multi-layered structure 53 with the lower metallic layer 53a, the magnetization-fixed layer 53b, the tunnel barrier layer 53c, the free layer 53d and the first upper metallic layer 53e stacked in this order from the bottom.

Without removing the mask, a film for an insulation layer made of an insulation material such as $Al_2O_3$ or $SiO_2$ is deposited thereon by a sputtering method, an IBD (Ion Beam Deposition) method or the like to have a thickness of about 3 to 20 nm (Step S97). As films for the soft magnetic layer for magnetic domain control, a film made of NiFe for example with a thickness of about 20 nm and a film made of CoFe with a thickness of about 1 nm are deposited thereon by a sputtering method or an IBD method for example (Step S98). Then, a film for a protection layer made of Ta for example with a thickness of about 2 nm is deposited thereon by a sputtering method or an IBD method for example (Step S99). In a desired embodiment, an $Al_2O_3$ film with a thickness of about 5 nm is deposited as the film for the insulation layer, a NiFe film with a thickness of about 20 nm and a CoFe film with a thickness of about 1 nm are deposited thereon as the film for the soft magnetic layer for magnetic domain control, and a Ta film with a thickness of about 2 nm is deposited thereon as the film for the protection layer.

Figure 10B:
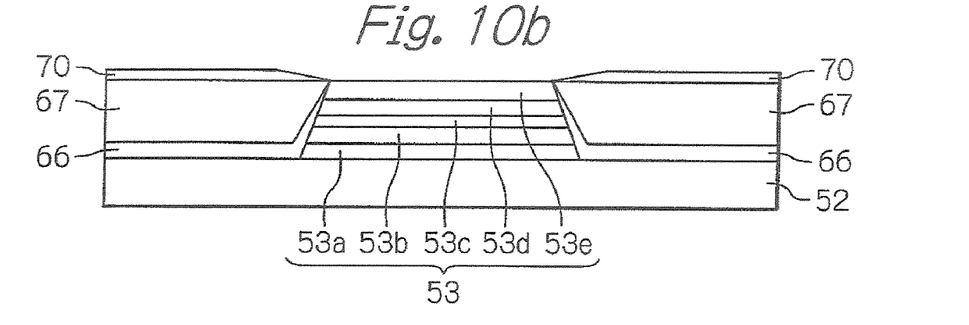

Thereafter, the mask is removed to complete lift-off (Step S100). FIG. 10b shows this state. As will be noted from this figure, the insulation layers 66, the magnetic domain control soft magnetic layers 67 and the magnetic domain control protection layers 70 are stacked on side surfaces of the TMR multi-layered structure 53 and on the lower electrode layer 52.

Figure 10C:
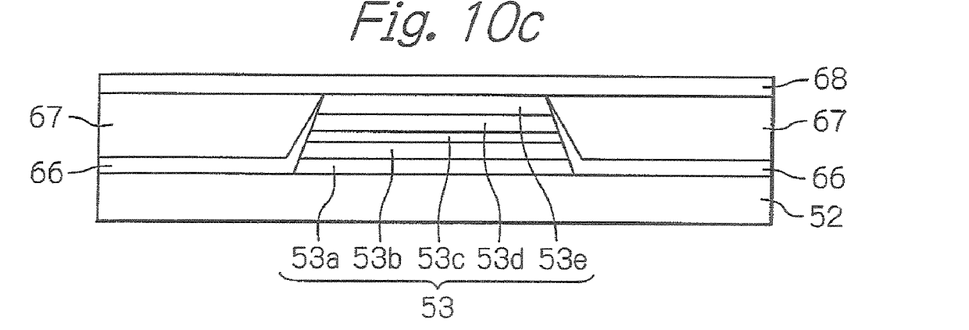

After the magnetic domain control protection layers 70 are removed by an ion milling or the like (Step S101), a film made of IrMn, PtMn, NiMn or RuRhMn for example with a thickness of about 5 to 10 nm is deposited by a sputtering method or an IBD method for example on the magnetic domain control soft magnetic layers 67 and the first upper metallic layer 53e of the TMR multi-layered structure 53 to stack the anti-ferromagnetic layer for magnetic domain control 68 (Step S102). In a desired embodiment, as the anti-ferromagnetic layer for magnetic domain control 68, an IrMn film with a thickness of about 6 nm is deposited. FIG. 10c shows this state. As will be noted from the figure, because the magnetic domain control anti-ferromagnetic layer 68 is formed after the lift-off, it is possible that this anti-ferromagnetic layer continuously covers over the TMR multi-layered structure 53 and the soft magnetic layers for magnetic domain control 67. Thus, this anti-ferromagnetic layer results in having a sufficient thickness even in the vicinity of the junction of the TMR multi-layered structure 53.

Then, a second upper metallic layer 69 made of Ru for example with a thickness of about 5 nm is formed on the anti-ferromagnetic layer for magnetic domain control 68 by a sputtering method for example (Step S103). In a desired embodiment, as the second upper metallic layer 69, a Ru layer with a thickness of about 5 nm is deposited.

Figure 10D:
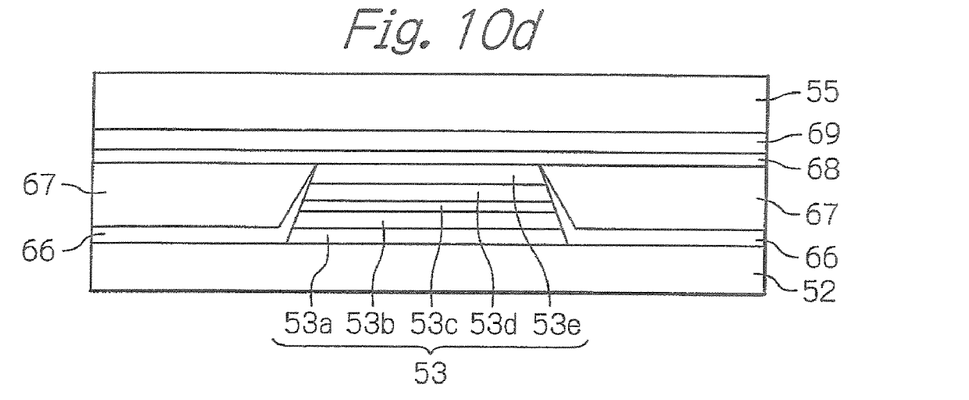

Then, the upper electrode layer 55 that serves also as an upper shield layer is formed on the second upper metallic layer 69 (Step S104). The upper electrode layer 55 is formed by stacking a metallic magnetic material such as NiFe, CoFe, FeNiCo, FeAlSi, FeN, FeZrN, FeTaN, CoZrNb or CoZrTa using a frame plating method for example to have a thickness of about 0.1 to 3 µm. In a desired embodiment, as the upper electrode layer 55, a NiFe layer with a thickness of about 2 µm is formed. FIG. 10d shows this state.

In a modification of this embodiment, a lift-off process may be performed without depositing the film for the protection layer at Step S99. In such case, as is obvious, no removing of the protection layer at Step S101 will be performed.

Configuration of the magnetic sensitive portion, that is, configuration of films for the magnetization-fixed layer, the tunnel barrier layer and the magnetization-free layer of the TMR multi-layered structure 53 is not limited to that of the abovementioned embodiment, and various materials and film thicknesses can be applicable for these films. For example, the magnetization-fixed layer may be formed from the anti-ferromagnetic film plus a single-layered structure of the ferromagnetic film, or from the anti-ferromagnetic film plus a multi-layered structure other than the three-layered structure. Further, the magnetization-free layer may be formed from a single-layered structure with no high polarization film, or from a multi-layered structure with at least three layers including a magnetostrictive adjustment film, other than the aforementioned two-layered structure. Still further, in the magnetic sensitive portion, the stacking order of the magnetization-fixed layer, the tunnel barrier layer and the magnetization-free layer may be reverse. Namely, the magnetization-free layer, the tunnel barrier layer and the magnetization-fixed layer may be stacked in this order from the bottom. In the latter case, the anti-ferromagnetic film in the magnetization-fixed layer is located at the top.

According to this embodiment, since the anti-ferromagnetic layer for magnetic domain control 68 is formed after the lift-off process, this anti-ferromagnetic layer for magnetic domain control 68 covers continuously over the TMR multi-layered structure 53 and the soft magnetic layers for magnetic domain control 67. Thus, it is possible to make the thickness of this magnetic domain control anti-ferromagnetic layer 68 sufficiently large in the vicinity of the junction of the TMR multi-layered structure 53, and thereby the exchange-coupling between the magnetic domain control anti-ferromagnetic layer 68 and the magnetic domain control soft magnetic layers 67 is made sufficiently so strong that in this portion. It becomes therefore possible to supply to the magnetization-free layer 53$d$ of the TMR multi-layered structure 53 sufficient bias magnetic fields for magnetic domain control. As a result, the magnetization-free layer 53$d$ is surely rendered single magnetic domain so that noise such as Barkhausen noise can be effectively suppressed, resulting in achieving a better linear response of the TMR read head element.

Figure 11:
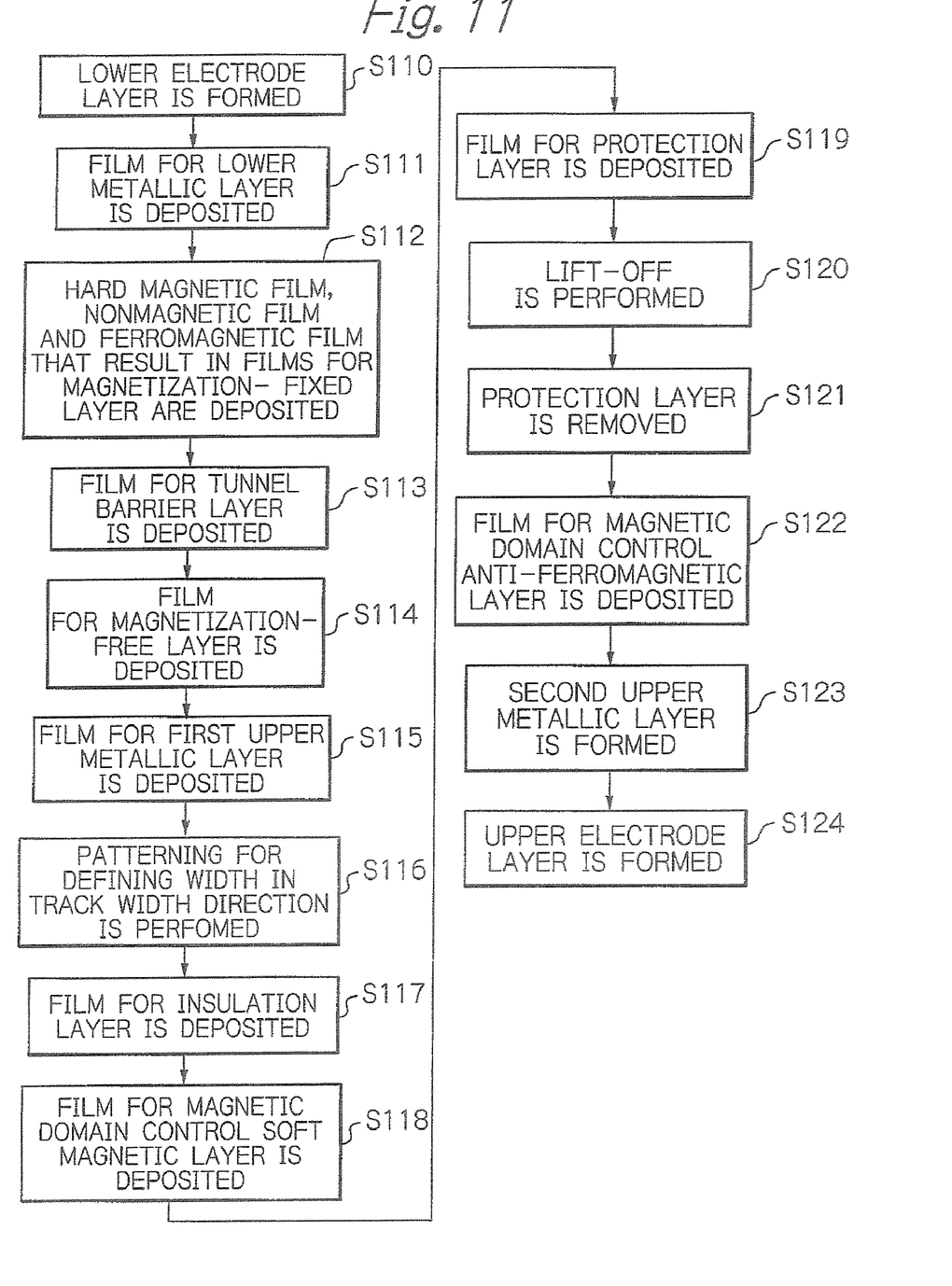
FIG. 11 is a flowchart illustrating in detail a manufacturing process of a read head element in another embodiment of the present invention.

FIG. 11 illustrates in detail a flow of the manufacturing process of the TMR read head element in another embodiment according to the present invention. In this embodiment, a hard magnetic layer for magnetic pinning is used as the magnetization-fixed layer, and the rest of the configuration other than the magnetization-fixed layer is the same as that of the aforementioned embodiment. Accordingly, in the following description, the same reference numerals are used for the similar components as these in the aforementioned embodiment.

First, on the under insulation layer 51 (FIG. 5), the lower electrode layer 52 that serves also as the lower shield layer is formed (Step S110). The lower electrode layer 52 is formed by stacking a metallic magnetic material such as NiFe, CoFe, FeNiCo, FeAlSi, FeN, FeZrN, FeTaN, CoZrNb or CoZrTa by a frame plating method for example to have a thickness of about 0.1 to 3 μm. In a desired embodiment, as the lower electrode layer 52, a NiFe layer with a thickness of about 2 μm is formed.

On the lower electrode layer 52, deposited is a two-layered structure film for a lower metallic layer 53$a'$, consisting of a first film and a second film laminated on the first film, by a sputtering method for example (Step S111). The first film is made of Ta, Cr, Hf, Nb, Zr, Ti, Mo, W or the like, with a thickness of about 0.5 to 5 nm. The second film is made of CrTi, Ru, NiCr, NiFe, NiFeCr, Co, CoFe or the like, with a thickness of about 1 to 6 nm. In a desired embodiment, as the film for the lower metallic layer 53$a'$, a Ta film with a thickness of about 1 nm is deposited and an CrTi film with a thickness of about 3 nm is deposited on the Ta film.

Films for the magnetization-fixed layer 53$b'$ are deposited thereon (Step S112). In this embodiment, the films for the magnetization-fixed layer 53$b'$ are formed by sequentially depositing a hard magnetic film (film for a pinning layer) made of cobalt platinum (CoPt) or the like with a thickness of about 5 to 30 nm, a film for a nonmagnetic layer made of Ru or the like with a thickness of about 0.8 nm and a ferromagnetic film (film for a pinned layer) made of CoFe, CoFeSi, CoMnGe, CoMnSi, CoMnAl or the like with a thickness of about 1 to 3 nm, by a sputtering method for example. In a desired embodiment, as the film for the magnetization-fixed layer 53$b'$, a CoPt film with a thickness of about 5 nm, a Ru film with a thickness of about 0.8 nm and a CoFe film with a thickness of about 3 nm are stacked in this order from the bottom.

On the film for the magnetization-fixed layer 53$b'$, a film for the tunnel barrier layer 53$c'$ made of an oxide including Al, Ti, Ta, Zr, Hf, Mg, Si or Zn is deposited to have a thickness of about 0.5 to 1 nm (Step S113). In a desired embodiment, as the film for the tunnel barrier layer 53$c'$, an $Al_2O_3$ film with a thickness of about 0.6 nm is deposited.

On the film for the tunnel barrier layer 53$c'$, a high polarization film made of CoFe, CoFeSi, CoMnGe, CoMnSi, CoMnAl or the like, with a thickness of about 1 nm, and a soft magnetic film made of NiFe or the like, with a thickness of about 1 to 9 nm are sequentially deposited by a sputtering method, for example, to form a film for the magnetization-free layer (free layer) 53$d'$ (Step S114). In a desired embodiment, as the film for the free layer 53$d'$, a CoFe film with a thickness of about 1 nm is deposited and a NiFe film with a thickness of about 3 nm is deposited on the CoFe film.

A film for the first upper metallic layer 53$e'$ made of a nonmagnetic conductive material such as Ta, Ru, Hf, Nb, Zr, Ti, Cr, W or the like with a thickness of about 1 to 10 nm is deposited to have a single layer structure or a two or more layers structure by a sputtering method for example (Step S115). In a desired embodiment, as the film for the first upper metallic layer 53$e'$, a Ta film with a thickness of about 6 nm is deposited. FIG. 10$a$ shows this state.

Then, the TMR multi-layered film thus formed is patterned to define a width TW in the track width direction (Step S116). First, a mask (not shown) that serves as a resist pattern for lift-off is formed on the TMR multi-layered film, and then an ion milling, for example an ion beam etching by Ar ions, is performed by using the mask. The ion-milling provides the TMR multi-layered structure 53 with the lower metallic layer 53$a$, the magnetization-fixed layer 53$b$, the tunnel barrier layer 53$c$, the free layer 53$d$ and the first upper metallic layer 53$e$ stacked in this order from the bottom.

Without removing the mask, a film for an insulation layer made of an insulation material such as $Al_2O_3$ or $SiO_2$ is deposited thereon by a sputtering method, an IBD method or the like to have a thickness of about 3 to 20 nm (Step S117). As films for the soft magnetic layer for magnetic domain control, a film made of NiFe for example with a thickness of about 20 nm and a film made of CoFe with a thickness of about 1 nm are deposited thereon by a sputtering method or an IBD method for example (Step S118). Then, a film for a protection layer made of Ta for example with a thickness of about 2 nm is deposited thereon by a sputtering method or an IBD method for example (Step S119). In a desired embodiment, a an $Al_2O_3$ film with a thickness of about 5 nm is deposited as the film for the insulation layer, a NiFe film with a thickness of about 20 nm and a CoFe film with a thickness of about 1 nm are deposited thereon as the film for the soft magnetic layer for magnetic domain control, and a Ta film with a thickness of about 2 nm is deposited thereon as the film for the protection layer.

Thereafter, the mask is removed to complete lift-off (Step S120). FIG. 10b shows this state. As will be noted from this figure, the insulation layers 66, the magnetic domain control soft magnetic layers 67 and the magnetic domain control protection layers 70 are stacked on side surfaces of the TMR multi-layered structure 53 and on the lower electrode layer 52.

After the magnetic domain control protection layers 70 are removed by an ion milling or the like (Step S121), a film made of IrMn, PtMn, NiMn or RuRhMn for example with a thickness of about 5 to 10 nm is deposited by a sputtering method or an IBD method for example on the magnetic domain control soft magnetic layers 67 and the first upper metallic layer 53e of the TMR multi-layered structure 53 to stack the anti-ferromagnetic layer for magnetic domain control 68 (Step S122). In a desired embodiment, as the anti-ferromagnetic layer for magnetic domain control 68, an IrMn film with a thickness of about 6 nm is deposited. FIG. 10c shows this state. As will be noted from the figure, because the magnetic domain control anti-ferromagnetic layer 68 is formed after the lift-off, it is possible that this anti-ferromagnetic layer continuously covers over the TMR multi-layered structure 53 and the soft magnetic layers for magnetic domain control 67. Thus, this anti-ferromagnetic layer results in having a sufficient thickness even in the vicinity of the junction of the TMR multi-layered structure 53.

Then, a second upper metallic layer 69 made of Ru for example with a thickness of about 5 nm is formed on the anti-ferromagnetic layer for magnetic domain control 68 by a sputtering method for example (Step S123). In a desired embodiment, as the second upper metallic layer 69, a Ru layer with a thickness of about 5 nm is deposited.

Then, the upper electrode layer 55 that serves also as an upper shield layer is formed on the second upper metallic layer 69 (Step S124). The upper electrode layer 55 is formed by stacking a metallic magnetic material such as NiFe, CoFe, FeNiCo, FeAlSi, FeN, FeZrN, FeTaN, CoZrNb or CoZrTa using a frame plating method for example to have a thickness of about 0.1 to 3 μm. In a desired embodiment, as the upper electrode layer 55, a NiFe layer with a thickness of about 2 μm is formed. FIG. 10d shows this state.

In a modification of this embodiment, a lift-off process may be performed without depositing the film for the protection layer at Step S119. In such case, as is obvious, no removing of the protection layer at Step S121 will be performed.

Configuration of the magnetic sensitive portion, that is, configuration of films for the magnetization-fixed layer, the tunnel barrier layer and the magnetization-free layer of the TMR multi-layered structure 53 is not limited to that of the abovementioned embodiment, and various materials and film thicknesses can be applicable for these films. For example, the magnetization-fixed layer may be formed from the anti-ferromagnetic film plus a single-layered structure of the ferromagnetic film, or from the anti-ferromagnetic film plus a multi-layered structure other than the three-layered structure. Further, the magnetization-free layer may be formed from a single-layered structure with no high polarization film, or from a multi-layered structure with at least three layers including a magnetostrictive adjustment film, other than the aforementioned two-layered structure. Still further, in the magnetic sensitive portion, the stacking order of the magnetization-fixed layer, the tunnel barrier layer and the magnetization-free layer may be reverse. Namely, the magnetization-free layer, the tunnel barrier layer and the magnetization-fixed layer may be stacked in this order from the bottom. In the latter case, the anti-ferromagnetic film in the magnetization-fixed layer is located at the top.

According to this embodiment, since the anti-ferromagnetic layer for magnetic domain control 68 is formed after the lift-off process, this anti-ferromagnetic layer for magnetic domain control 68 covers continuously over the TMR multi-layered structure 53 and the soft magnetic layers for magnetic domain control 67. Thus, it is possible to make the thickness of this magnetic domain control anti-ferromagnetic layer 68 sufficiently large in the vicinity of the junction of the TMR multi-layered structure 53, and thereby the exchange-coupling between the magnetic domain control anti-ferromagnetic layer 68 and the magnetic domain control soft magnetic layers 67 is made sufficiently so strong that in this portion. It becomes therefore possible to supply to the magnetization-free layer 53d of the TMR multi-layered structure 53 sufficient bias magnetic fields for magnetic domain control. As a result, the magnetization-free layer 53d is surely rendered single magnetic domain so that noise such as Barkhausen noise can be effectively suppressed, resulting in achieving a better linear response of the TMR read head element.

In the aforementioned embodiment, a hard magnetic film is used for the magnetization-fixed layer of the MR element and an anti-ferromagnetic film and a soft magnetic film are used for the magnetic domain control layer. Namely, different magnetization-fixing principles perform pinning in the MR element and magnetic domain control of the free layer, respectively. More specifically, the magnetization-fixed layer is magnetized by polarization of hard magnetic material, whereas the magnetic control layer is magnetized by annealing of soft magnetic material under magnetic field. Thus, it is possible to magnetize these layers in ideal directions different from each other by 90 degrees, which is desirable as compared to the case where both layers are formed from the anti-ferromagnetic film and the soft magnetic film. Further, using of the hard magnetic film for the magnetization-fixed layer can reduce the entire film thickness of the MR element resulting that a higher recording density, in particular, a higher BPSI (Bits Per Square Inch) can be attained.

Many widely different embodiments of the present invention may be constructed without departing from the spirit and scope of the present invention. It should be understood that the present invention is not limited to the specific embodiments described in the specification, except as defined in the appended claims.

The invention claimed is:
1. A thin-film magnetic head comprising:
a lower electrode layer;
a magnetoresistive effect multi-layered structure, through which a current passes in a direction perpendicular to a lamination plane, stacked on said lower electrode layer;
soft magnetic layers for magnetic domain control formed on both lateral sides respectively in a track width direction of said magnetoresistive effect multi-layered structure;
an anti-ferromagnetic layer for magnetic domain control continuously stacked on said magnetoresistive effect multi-layered structure and said soft magnetic layers for magnetic domain control, said anti-ferromagnetic layer mutually exchanged-coupled to said soft magnetic layers for magnetic domain control; and
an upper electrode layer stacked on said anti-ferromagnetic layer for magnetic domain control.

2. The thin-film magnetic head as claimed in claim 1, wherein said magnetoresistive effect multi-layered structure comprises a magnetization-fixed layer, a magnetization free layer, and a nonmagnetic conductive layer or a tunnel barrier layer stacked between said magnetization-fixed layer and said magnetization- free layer.

3. The thin-film magnetic head as claimed in claim 2, wherein said magnetization-fixed layer comprises a soft magnetic layer for magnetization fixing and an anti-ferromagnetic layer for magnetization fixing, which is exchange-coupled to said soft magnetic layer for magnetization fixing.

4. The thin-film magnetic head as claimed in claim 2, wherein said magnetization-fixed layer comprises a hard magnetic layer for magnetization fixing.

5. The thin-film magnetic head as claimed in claim 1, wherein a thickness of said anti-ferromagnetic layer for magnetic domain control is 5 nm or more.

6. The thin-film magnetic head as claimed in claim 1, wherein an inductive write head element is formed on said upper electrode layer of a magnetoresistive effect read head element.

7. A magnetic disk drive apparatus including a magnetic disk, at least one thin-film magnetic head, and a support mechanism for supporting said at least one thin-film magnetic head so that said at least one thin-film magnetic head faces a surface of said magnetic disk,
    said at least one thin-film magnetic head comprising:
    a lower electrode layer;
    a magnetoresistive effect multi-layered structure, through which a current passes in a direction perpendicular to a lamination plane, stacked on said lower electrode layer;
    soft magnetic layers for magnetic domain control formed on both lateral sides respectively in a track width direction of said magnetoresistive effect multi-layered structure;
    an anti-ferromagnetic layer for magnetic domain control continuously stacked on said magnetoresistive effect multi-layered structure and said soft magnetic layers for magnetic domain control, said anti-ferromagnetic layer mutually exchanged-coupled to said soft magnetic layers for magnetic domain control; and
    an upper electrode layer stacked on said anti-ferromagnetic layer for magnetic domain control.

8. The magnetic disk drive apparatus as claimed in claim 7, wherein said magnetoresistive effect multi-layer structure comprises a magnetization-fixed layer, a magnetization-free layer, and nonmagnetic conductive layer or a tunnel barrier layer stacked between said magnetization-fixed layer and said magnetization-free layer.

9. The magnetic disk drive apparatus as claimed in claim 8, wherein said magnetization-fixed layer comprises a soft magnetic layer for magnetization fixing and an anti-ferromagnetic layer for magnetization fixing, which is exchange-coupled to said soft magnetic layer for magnetization fixing.

10. The magnetic disk drive apparatus as claimed in claim 8, wherein said magnetization-fixed layer comprises a hard magnetic layer for magnetization fixing.

11. The magnetic disk drive apparatus as claimed in claim 7, wherein a thickness of said anti-ferromagnetic layer for magnetic domain control is 5 nm or more.

\* \* \* \* \*